United States Patent
Lee et al.

(10) Patent No.: US 11,291,027 B2
(45) Date of Patent: *Mar. 29, 2022

(54) BLIND SCHEDULING APPARATUS AND METHOD IN A MOBILE COMMUNICATION SYSTEM

(71) Applicant: Samsung Electronics Co., Ltd., Suwon-si (KR)

(72) Inventors: Ok-Seon Lee, Suwon-si (KR); Soeng-Hun Kim, Suwon-si (KR); Yung-Soo Kim, Seongnam-si (KR); Kyeong-In Jeong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

This patent is subject to a terminal disclaimer.

(21) Appl. No.: 16/907,106

(22) Filed: Jun. 19, 2020

(65) Prior Publication Data

US 2020/0322975 A1    Oct. 8, 2020

Related U.S. Application Data

(63) Continuation of application No. 16/259,951, filed on Jan. 28, 2019, now Pat. No. 10,694,537, which is a
(Continued)

(51) Int. Cl.
*H04W 72/12* (2009.01)
*H04W 74/00* (2009.01)
(Continued)

(52) U.S. Cl.
CPC ....... *H04W 72/1268* (2013.01); *H04L 1/1829* (2013.01); *H04L 1/1861* (2013.01);
(Continued)

(58) Field of Classification Search
CPC ............ H04W 72/12; H04W 72/1263; H04W 72/1268; H04W 74/00; H04W 74/002;
(Continued)

(56) References Cited

U.S. PATENT DOCUMENTS 6,058,109 A    5/2000  Lechleider
8,279,772 B2   10/2012 Jersenius et al.
(Continued)

FOREIGN PATENT DOCUMENTS

EP        2120480 A1      11/2009
KR    10-2006-0026067 A    3/2006
(Continued)

OTHER PUBLICATIONS

International Search Report dated Dec. 27, 2011 in connection with International Application No. PCT/KR2011/004359.
(Continued)

*Primary Examiner* — Warner Wong

(57) ABSTRACT

A system and a method minimize power consumption, signalling overhead, and processing load in blind scheduling in a mobile communication system. A User Equipment (UE) detects a type of an uplink (UL) grant while it is periodically allocated the UL grant. If there is no data to transmit using the UL grant, the UE determines whether to transmit a padding Medium Access Control (MAC) Protocol Data Unit (PDU) to an Evolved Universal Terrestrial Radio Access Network (E-UTRAN) Node B (eNB) using the UL grant according to the type of the UL grant.

16 Claims, 10 Drawing Sheets

Related U.S. Application Data continuation of application No. 15/194,378, filed on Jun. 27, 2016, now Pat. No. 10,194,458, which is a continuation of application No. 13/165,202, filed on Jun. 21, 2011, now Pat. No. 9,414,403.

(51) Int. Cl.
  *H04L 1/18* (2006.01)
  *H04W 52/02* (2009.01)

(52) U.S. Cl.
  CPC ..... *H04W 52/0209* (2013.01); *H04W 74/008* (2013.01); *Y02D 30/70* (2020.08)

(58) Field of Classification Search
  CPC ............... H04W 74/008; H04W 52/00; H04W 52/0209; H04W 72/00; H04W 72/008; H04W 72/02; H04W 72/04; H04W 72/08; H04W 72/14; H04W 74/02; H04W 74/04; H04W 74/08; H04W 74/14; H04L 1/18; H04L 1/1829; H04L 1/1861
  See application file for complete search history.

(56) References Cited

U.S. PATENT DOCUMENTS

| | | | |
|---|---|---|---|
| 8,767,644 B2 | 7/2014 | Wager et al. | |
| 2004/0268351 A1 | 12/2004 | Mogensen et al. | |
| 2006/0094366 A1 | 5/2006 | Cho et al. | |
| 2007/0201397 A1 | 8/2007 | Zhang | |
| 2008/0045272 A1 | 2/2008 | Wang et al. | |
| 2009/0052388 A1* | 2/2009 | Kim | H04W 74/0833 370/329 |
| 2009/0137254 A1 | 5/2009 | Vukovic et al. | |
| 2009/0190568 A1 | 7/2009 | Son et al. | |
| 2010/0002590 A1* | 1/2010 | Park | H04W 74/006 370/241 |
| 2010/0074201 A1* | 3/2010 | Wu | H04L 5/0007 370/329 |
| 2010/0111026 A1 | 5/2010 | Hsu | |
| 2010/0111032 A1* | 5/2010 | Wu | H04W 74/0833 370/331 |
| 2010/0142470 A1* | 6/2010 | Park | H04L 1/1854 370/329 |
| 2010/0238875 A1* | 9/2010 | Sung | H04L 1/1854 370/329 |
| 2011/0021203 A1 | 1/2011 | Yamada et al. | |
| 2011/0032889 A1 | 2/2011 | Lee et al. | |
| 2011/0038334 A1 | 2/2011 | Huang et al. | |
| 2011/0044195 A1 | 2/2011 | Wiemann et al. | |
| 2011/0103316 A1 | 5/2011 | Ulupinar et al. | |
| 2011/0164574 A1 | 7/2011 | Rao et al. | |
| 2011/0176500 A1 | 7/2011 | Wager et al. | |
| 2011/0211447 A1 | 9/2011 | Wang et al. | |
| 2011/0235609 A1* | 9/2011 | Ahn | H04W 74/002 370/329 |
| 2011/0249641 A1* | 10/2011 | Kwon | H04W 74/0858 370/329 |
| 2011/0261763 A1* | 10/2011 | Chun | H04W 74/008 370/329 |
| 2012/0069805 A1 | 3/2012 | Feuersanger et al. | |
| 2013/0322387 A1* | 12/2013 | Kim | H04W 72/0413 370/329 |
| 2016/0270117 A1 | 9/2016 | Wang et al. | |
| 2017/0048843 A1 | 2/2017 | Wang et al. | |

FOREIGN PATENT DOCUMENTS

| | | |
|---|---|---|
| KR | 10-0939722 B1 | 2/2010 |
| WO | 2008/115029 A2 | 9/2008 |
| WO | 2009/025525 A1 | 2/2009 |
| WO | 2009/120630 A1 | 10/2009 |

OTHER PUBLICATIONS

Written Opinion of International Searching Authority dated Dec. 27, 2011 in connection with International Application No. PCT/KR2011/004359.
R1-103120, "R-PDCCH Multiplexing for DL Grant Only and UL Grant Only", 3GPP TSG RAN WG1 Meeting #61, May 10-14, 2010, 2 pages.
R2-073364, "DL Multiplexing for Persistent and Dynamic Scheduling", RAN Working Group 2 Meeting #57, Aug. 20-24, 2007, 3 pages.
Notification of Reasons for Rejection dated Jun. 7, 2016 in connection with Korean Application No. 10-2010-0058717, 9 pages.
Foreign Communication From a Related Counterpart Application, European Application No. 11798337.9-1854, Communication Pursuant to Rule 164(1) EPC dated Jan. 10, 2017, 6 pages.
HTC Corporation, "BSR Triggering with Semi-Persistent Scheduling", 3GPP TSG-RAN WG2 #63bis, Sep. 22, 2008, 7 pages.
Supplementary European Search Report dated Apr. 18, 2017 in connection with European Patent Application No. EP 11 79 8337.

\* cited by examiner

BLIND SCHEDULING APPARATUS AND METHOD IN A MOBILE COMMUNICATION SYSTEM

CROSS-REFERENCE TO RELATED APPLICATIONS

This application is a continuation of U.S. patent application Ser. No. 16/259,951 filed on Jan. 28, 2019, which is a continuation of Ser. No. 15/194,378 filed on Jun. 27, 2016, now U.S. Pat. No. 10,194,458 issued on Jan. 29, 2019, which is a continuation of U.S. patent application Ser. No. 13/165,202 filed on Jun. 21, 2011, now U.S. Pat. No. 9,414,403 issued on Aug. 9, 2016, which claims priority to Korean Patent Application No. 10-2010-0058717 filed on Jun. 21, 2010, the disclosures of which are herein incorporated by reference in their entirety.

BACKGROUND

1. Field

The present invention relates to a blind scheduling apparatus and method in a mobile communication system.

2. Description of Related Art

Next-generation communication systems have evolved to provide a variety of high-speed, high-capacity services to User Equipment's (UEs). Long Term Evolution (LTE) communication system, an example of the next-generation communication systems, uses various resource allocation schemes, one of which is blind scheduling.

The blind scheduling is a scheme in which an Evolved Universal Terrestrial Radio Access Network (E-UTRAN) Node B (eNB) periodically allocates a dedicated uplink (UL) resource without prior information about the amount of data that a UE will transmit over an UL. The LTE communication system considers using blind scheduling for latency reduction. The amount of data that a UE will transmit over a UL may be detected using the buffer status. For convenience, a dedicated UL resource that is periodically allocated to a UE using blind scheduling will be referred to herein as a 'UL grant'.

When employing blind scheduling, an eNB continuously allocates a dedicated UL resource or a UL grant to a UE for a relatively long period. So, the UE is continuously allocated the UL grant by the eNB such that, even when the UE has no data, it will actually transmit on a UL.

Semi-Persistent Scheduling (SPS) is one of the blind scheduling schemes. When using SPS, an eNB periodically allocates a UL grant to a UE to which an SPS Cell Radio Network Temporary Identifier (C-RNTI) has been allocated. The eNB may inform the UE of a UL grant allocation period using an SPS configuration Information Element (IE). The UE may transmit data to the eNB using the periodically allocated UL grant. Therefore, the UE may skip the UL resource allocation process that it should perform with the eNB to be allocated a UL resource, contributing to a reduction in the latency.

When the LTE communication system uses SPS, the latency may be reduced due to the possible skip of the UL resource allocation process. However, a UE should transmit padding Medium Access Control (MAC) Protocol Data Units (PDUs) using a UL grant even when it has no data to transmit on a UL, which may cause a waste of the UE battery and lead to signaling overhead caused by the transmission of the padding MAC PDUs. In addition, the eNB unnecessarily decodes the padding MAC PDUs, causing a padding MAC PDU decoding processing load.

SUMMARY

To address the above-discussed deficiencies of the prior art, it is a primary object to provide a blind scheduling apparatus and method in a mobile communication system.

Another aspect of the present invention is to provide a blind scheduling apparatus and method for minimizing a waste of a UE battery caused by the transmission of padding MAC PDUs in a mobile communication system.

Another aspect of the present invention is to provide a blind scheduling apparatus and method for minimizing a signaling overhead caused by the transmission of padding MAC PDUs in a mobile communication system.

Yet another aspect of the present invention is to provide a blind scheduling apparatus and method for minimizing a processing load caused by the decoding of padding MAC PDUs in a mobile communication system.

In accordance with one aspect of the present invention, there is provided a blind scheduling method of a User Equipment (UE) in a mobile communication system. The blind scheduling method includes detecting a type of an uplink (UL) grant, while the UE is periodically allocated a UL grant. When there is no data to transmit using the UL grant, whether to transmit a padding Medium Access Control (MAC) Protocol Data Unit (PDU) to an Evolved Universal Terrestrial Radio Access Network (E-UTRAN) Node B (eNB) using the UL grant according to the type of the UL grant is determined.

In accordance with another aspect of the present invention, there is provided a blind scheduling method of an Evolved Universal Terrestrial Radio Access Network (E-UTRAN) Node B (eNB) in a mobile communication system. The blind scheduling method includes determining whether data is detected from an Explicit uplink (UL) grant that the eNB allocates to a User Equipment (UE). A new Explicit UL grant is allocated to the UE when no data is detected from the Explicit UL grant. And when data is detected from the Explicit UL grant, Hybrid Automatic Retransmission Request (HARQ) feedback information is transmitted to the UE according to a success/failure in decoding the data. The Explicit UL grant is a UL grant that serves as resource allocation information received from the eNB over a Physical Downlink Control Channel (PDCCH) without separate configuration, among UL grants which are allocated after being mapped to a Cell Radio Network Temporary Identifier (C-RNTI).

In accordance with another aspect of the present invention, there is provided a blind scheduling method of an Evolved Universal Terrestrial Radio Access Network (E-UTRAN) Node B (eNB) in a mobile communication system. The blind scheduling method includes determining whether data is detected from a Fast Access Scheduling (FAS) grant that the eNB allocates to a User Equipment (UE). A new FAS grant is allocated to the UE when no data is detected from the FAS grant. And when data is detected from the FAS grant, Hybrid Automatic Retransmission Request (HARD) feedback information is transmitted to the UE according to a success/failure in decoding the data. The FAS grant is an uplink (UL) grant that is allocated after being mapped to a FAS Cell Radio Network Temporary Identifier (C-RNTI). The FAS C-RNTI is a C-RNTI that is allocated to a UE to allow the UE to not transmit a padding MAC PDU using the FAS grant.

In accordance with another aspect of the present invention, there is provided a blind scheduling method of a user equipment (UE) in a mobile communication system. The blind scheduling method includes determining whether there is data to transmit using an uplink (UL) grant, while the UE is periodically allocated the UL grant. And when there is no data to transmit using the UL grant, no padding Medium Access Control (MAC) Protocol Data Unit (PDU) is transmitted to an Evolved Universal Terrestrial Radio Access Network (E-UTRAN) Node B (eNB) using the UL grant.

In accordance with another aspect of the present invention, there is provided a blind scheduling method of an Evolved Universal Terrestrial Radio Access Network (E-UTRAN) Node B (eNB) in a mobile communication system. The blind scheduling method includes allocating an uplink (UL) grant to a user equipment (UE) using Semi-Persistent Scheduling (SPS). And when no data is detected from the UL grant, it is determined that the UE transmits no data using the UL grant.

In accordance with another aspect of the present invention, there is provided a user equipment (UE) for a mobile communication system. The UE includes a control unit detects a type of an uplink (UL) grant while the UE is periodically allocated a UL grant. And when there is no data to transmit using the UL grant, the UE determines whether to allow a transmission unit to transmit a padding Medium Access Control (MAC) Protocol Data Unit (PDU) to an Evolved Universal Terrestrial Radio Access Network (E-UTRAN) Node B (eNB) using the UL grant according to the type of the UL grant.

In accordance with another aspect of the present invention, there is provided an Evolved Universal Terrestrial Radio Access Network (E-UTRAN) Node B (eNB) for a mobile communication system. The eNB includes a resource allocation unit that allocates an Explicit Uplink (UL) grant under specific control. A transmission unit transmits Hybrid Automatic Retransmission Request (HARQ) feedback information to a user equipment (UE) under specific control. And a control unit determines whether data is detected from the Explicit UL grant, controls the resource allocation unit to allocate a new Explicit UL grant to the UE when no data is detected from the Explicit UL grant, and controls the transmission unit to transmit HARQ feedback information to the UE according to a success/failure in decoding data when data is detected from the Explicit UL grant. The Explicit UL grant is a UL grant that serves as resource allocation information received from the eNB over a Physical Downlink Control Channel (PDCCH) without separate configuration, among UL grants which are allocated after being mapped to a Cell Radio Network Temporary Identifier (C-RNTI).

In accordance with another aspect of the present invention, there is provided an Evolved Universal Terrestrial Radio Access Network (E-UTRAN) Node B (eNB) for a mobile communication system. The eNB includes a resource allocation unit, a transmission unit, and a control unit. The resource allocation unit allocates a Fast Access Scheduling (FAS) grant under specific control. The transmission unit transmits Hybrid Automatic Retransmission Request (HARQ) feedback information to a user equipment (UE) under specific control. And the control unit determines whether data is detected from the FAS grant, controls the resource allocation unit to allocate a new FAS grant to the UE when no data is detected from the FAS grant, and controls the transmission unit to transmit HARQ feedback information to the UE according to a success/failure in decoding data when data is detected from the FAS grant. The FAS grant is an uplink (UL) grant that is allocated after being mapped to a FAS Cell Radio Network Temporary Identifier (C-RNTI), and the FAS C-RNTI is a C-RNTI that is allocated to a UE to allow the UE to not transmit a padding MAC PDU using the FAS grant.

In accordance with another aspect of the present invention, there is provided a user equipment (UE) for a mobile communication system. The UE includes a control unit that determines whether there is data to transmit using an uplink (UL) grant while the UE is periodically allocated the UL grant, and when there is no data to transmit using the UL grant, determines to allow a transmission unit to not transmit a padding Medium Access Control (MAC) Protocol Data Unit (PDU) to an Evolved Universal Terrestrial Radio Access Network (E-UTRAN) Node B (eNB) using the UL grant.

In accordance with another aspect of the present invention, there is provided an Evolved Universal Terrestrial Radio Access Network (E-UTRAN) Node B (eNB) for a mobile communication system. The eNB includes a resource allocation unit and a control unit. The resource allocation unit allocates an uplink (UL) grant to a user equipment (UE) using Semi-Persistent Scheduling (SPS) under specific control. And a control unit controls the resource allocation unit to allocate the UL grant to the UE using SPS, and when no data is detected from the UL grant, determines that the UE transmits no data using the UL grant.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. In the following description, specific details such as detailed configuration and components are merely provided to assist the overall understanding of embodiments of the present invention. In addition, descriptions of well-known functions and constructions are omitted for clarity and conciseness.

An embodiment of the present invention provides a blind scheduling apparatus and method in a mobile communication system. In the following description of embodiments of the present invention, the mobile communication system is assumed to be a Long Term Evolution (LTE) communication system. However, it will be apparent to those skilled in the art that the blind scheduling apparatus and method proposed in the embodiments of the present invention may be used other mobile communication systems as well as the LTE communication system.

The blind scheduling method proposed in embodiments of the present invention may be roughly classified into a first blind scheduling scheme, a second blind scheduling scheme, and a third blind scheduling scheme, each of which will be described below.

In the first blind scheduling scheme, if a User Equipment (UE) being periodically allocated a dedicated uplink (UL) resource has no data to transmit on a UL, the UE determines whether to transmit padding Medium Access Control (MAC) Protocol Data Units (PDUs) according to the type of the allocated dedicated UL resource. For convenience, a dedicated UL resource that is periodically allocated to a UE will be referred to herein as a 'UL grant'.

In the second blind scheduling scheme, when having no data to transmit on a UL, a UE transmits no padding MAC PDU regardless of the type of a UL grant.

In the third blind scheduling scheme, if a UE being allocated a UL grant has no data to transmit on a UL, the UE determines whether to transmit padding MAC PDUs according to the type of a Cell Radio Network Temporary Identifier (C-RNTI).

A process of a UE in an LTE communication system using a first blind scheduling scheme according to an embodiment of the present invention will be described with reference to FIG. 1.

Figure 1:
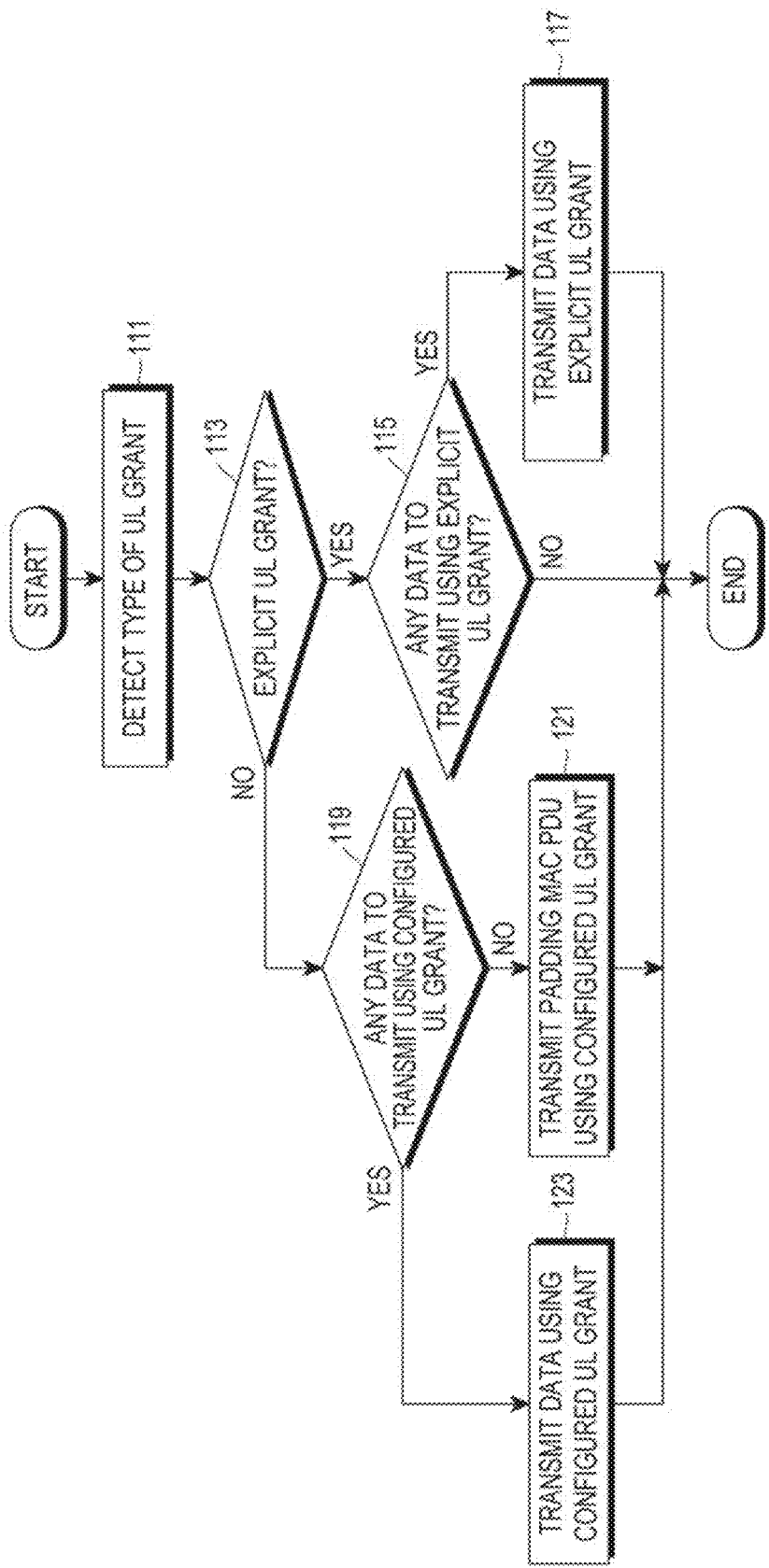
FIG. 1 illustrates a process of a UE in an LTE communication system using a first blind scheduling scheme according to an embodiment of the present invention.

FIG. 1 illustrates a process of a UE in an LTE communication system using a first blind scheduling scheme according to an embodiment of the present invention.

Referring to FIG. 1, the UE detects a type of a UL grant in block 111, and determines in block 113 whether the detected type of the UL grant is an Explicit UL grant. The Explicit UL grant represents a UL grant that merely serves as resource allocation information received from an Evolved Universal Terrestrial Radio Access Network (E-UTRAN) Node B (eNB) over a Physical Downlink Control Channel (PDCCH) without separate configuration, among UL grants which are allocated after being mapped to a C-RNTI. The Explicit UL grant may also be used to dynamically allocate transmission resources.

If the detected type of the UL grant is an Explicit UL grant, the UE determines in block 115 whether it has data to transmit using the Explicit UL grant. If the UE has no data to transmit using the Explicit UL grant, the UE ends its process. Specifically, in the conventional LTE communication system, even when having no data to transmit using a UL grant, a UE transmits padding MAC PDUs using the UL grant, thereby causing a waste of UE battery due to the transmission of padding MAC PDUs, a signaling overhead due to the exchange of padding MAC PDUs, and a processing load due to the decoding of padding MAC PDUs by an eNB. However, when using the first blind scheduling scheme, the UE transmits no padding MAC PDUs if it has no data to transmit using the Explicit UL grant, thereby preventing the above and other problems and disadvantages caused by the transmission of padding MAC PDUs.

However, if it is determined in block 115 that the UE has data to transmit using the Explicit UL grant, the UE transmits the data using the Explicit UL grant in block 117.

If it is determined in block 113 that the detected type of the UL grant is not an Explicit UL grant but a Configured UL grant, the UE proceeds to block 119. The Configured UL grant represents a UL grant that is allocated to a UE that has received a separate SPS configuration Information Element (IE) such as an SPS C-RNTI. Resource allocation information regarding the Configured UL grant is transmitted using a PDCCH, and once allocated, a transmission resource is valid until it is released or changed.

In block 119, the UE determines if it has data to transmit using the Configured UL grant. If the UE has no data to transmit using the Configured UL grant, the UE transmits padding MAC PDUs using the Configured UL grant in block 121, and then ends the process.

However, if it is determined in block 119 that the UE has data to transmit using the Configured UL grant, the UE transmits the data using the Configured UL grant in block 123, and then ends the process.

In FIG. 1, having data to transmit using an Explicit UL grant and a Configured UL grant means that transmittable data is present in the data stored in the UE. The data stored in the UE may be classified into data that can be transmitted and data that should not be transmitted, at an arbitrary time corresponding to a predetermined condition, e.g., a retransmission window status and a transmission window status.

As described with reference to FIG. 1, when having no data to transmit on a UL, the UE determines whether to transmit padding MAC PDUs according to the type of a UL grant. If the type of the UL grant is an Explicit UL grant, the UE transmits no padding MAC PDUs when it has no data to transmit on a UL. A signal exchange process between an eNB and a UE performed in this situation will be described with reference to FIG. 2.

Figure 2:
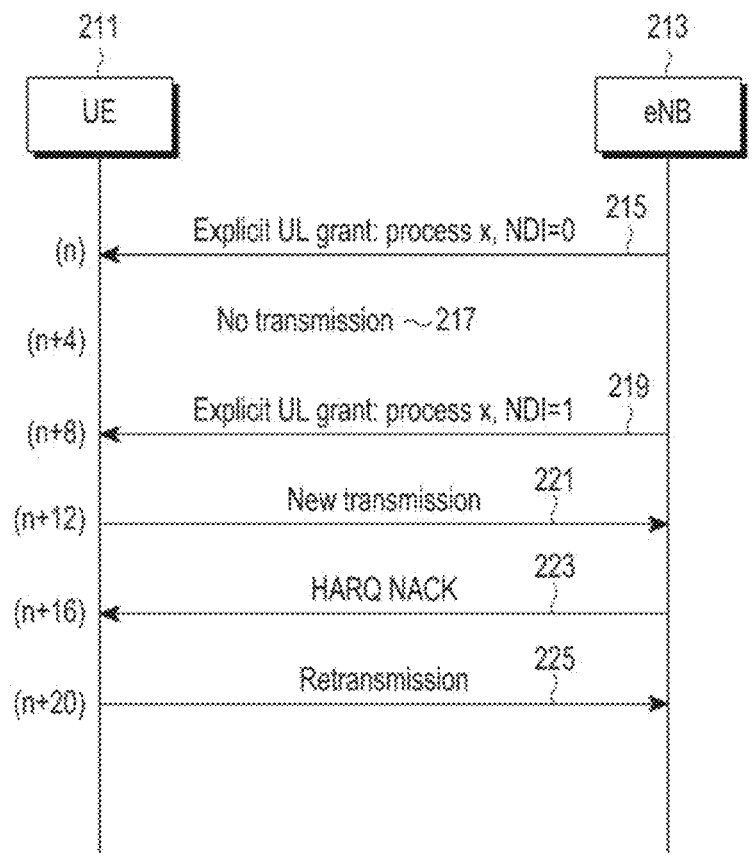
FIG. 2 is a signaling diagram of a signal exchange process between an eNB and a UE in an LTE communication system using the first blind scheduling scheme according to an embodiment of the present invention.

FIG. 2 illustrates a signal exchange process between an eNB and a UE in an LTE communication system using the first blind scheduling scheme according to an embodiment of the present invention.

Referring to FIG. 2, an eNB 213 sets a value of a New Data Indicator (NDI) for a Hybrid Automatic Retransmission Request (HARQ) process x to '0', and allocates an Explicit UL grant for the HARQ process x to a UE 211 in an n-th frame in step 215. Here, 'x' indicates a unique number of a HARQ process. In step 217, the UE 211 performs no operation because it has no data to transmit on a UL in (n+4)-th frame. That is, because the type of a UL grant is an Explicit UL grant, the UE 211 does not need to transmit padding MAC PDUs when it has no data to transmit on a UL.

Because the eNB 213 has received no data from the UE 211 even though it allocated the Explicit UL grant in the n-th frame, the eNB 213 sets a value of the NDI to '1' and allocates an Explicit UL grant for the HARQ process x to the UE 211 in an (n+8)-th frame in step 219. When having data to transmit on a UL, the UE 211 transmits the data using the Explicit UL grant in an (n+12)-th frame in step 221.

The eNB 213 decodes the data received from the UE 211 and transmits HARQ feedback information according to the success/failure in decoding. As for the HARQ feedback information, a HARQ ACK is transmitted when the decoding is successful, and a HARQ NACK is transmitted when the decoding is failed. Assuming in FIG. 2 that the eNB 213 has failed to decode the data received from the UE 211, the eNB 213 transmits a HARQ NACK to the UE 211 in an (n+16)-th frame in step 223. As the UE 211 receives the HARQ NACK from the eNB 213, the UE 211 retransmits the previously transmitted data to the eNB 213 in an (n+20)-th frame in step 225.

An operation of the eNB 213 in FIG. 2 will now be described in detail with reference to FIG. 3.

Figure 3:
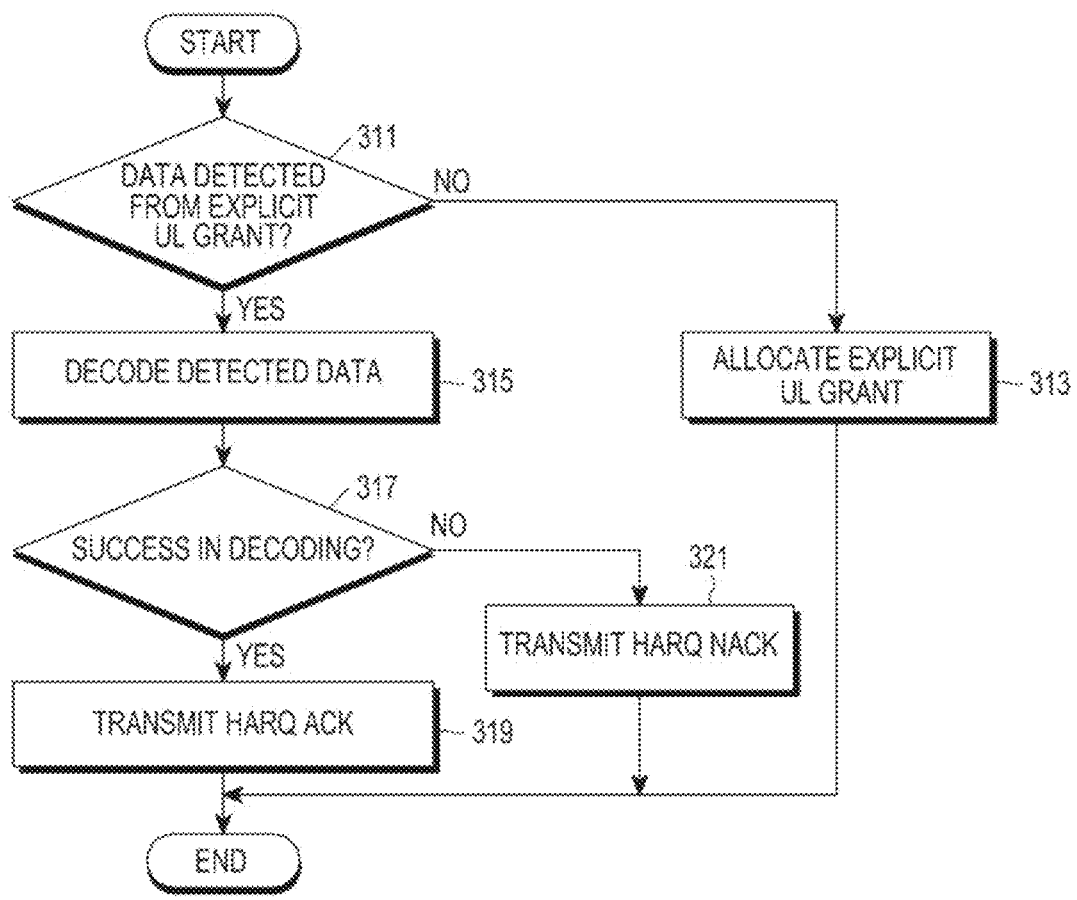
FIG. 3 illustrates a process of the eNB 213 in FIG. 2.

FIG. 3 illustrates a process of the eNB 213 in FIG. 2.

Referring to FIG. 3, the eNB 213 determines in block 311 whether data is detected from an allocated Explicit UL grant. If no data is detected from the Explicit UL grant, the eNB 213 proceeds to block 313. Detecting no data from an Explicit UL grant indicates that the UE 211 has not transmitted data using the Explicit UL grant or the eNB 213 has failed to receive data even though the UE 211 has transmitted the data using the Explicit UL grant. Therefore, considering the situation in which the eNB 213 has failed to receive data even though the UE 211 has transmitted the data using the Explicit UL grant, the eNB 213 sets a value of an NDI to '1' and allocates an Explicit UL grant to the UE 211 in block 313. That is, the eNB 213 may normally operate, even though the UE 211 transmits no padding MAC PDUs as it has no data to transmit on a UL.

However, if it is determined in block 311 that data is detected from the Explicit UL grant, the eNB 213 decodes the detected data in block 315, and determines in block 317 whether it has succeeded in decoding the detected data. If the eNB 213 has succeeded in decoding the detected data, the eNB 213 transmits an HARQ ACK to the UE 211 in block 319.

However, if it is determined in block 317 that the eNB 213 has failed in decoding the detected data, the eNB 213 transmits an HARQ NACK to the UE 211 in block 321.

The operation of the eNB 213, described above with reference to FIG. 3, may be performed more effectively when its energy detection reliability is relatively high.

Next, an operation of the UE 211 in FIG. 2 will be described in detail with reference to FIG. 4.

Figure 4:
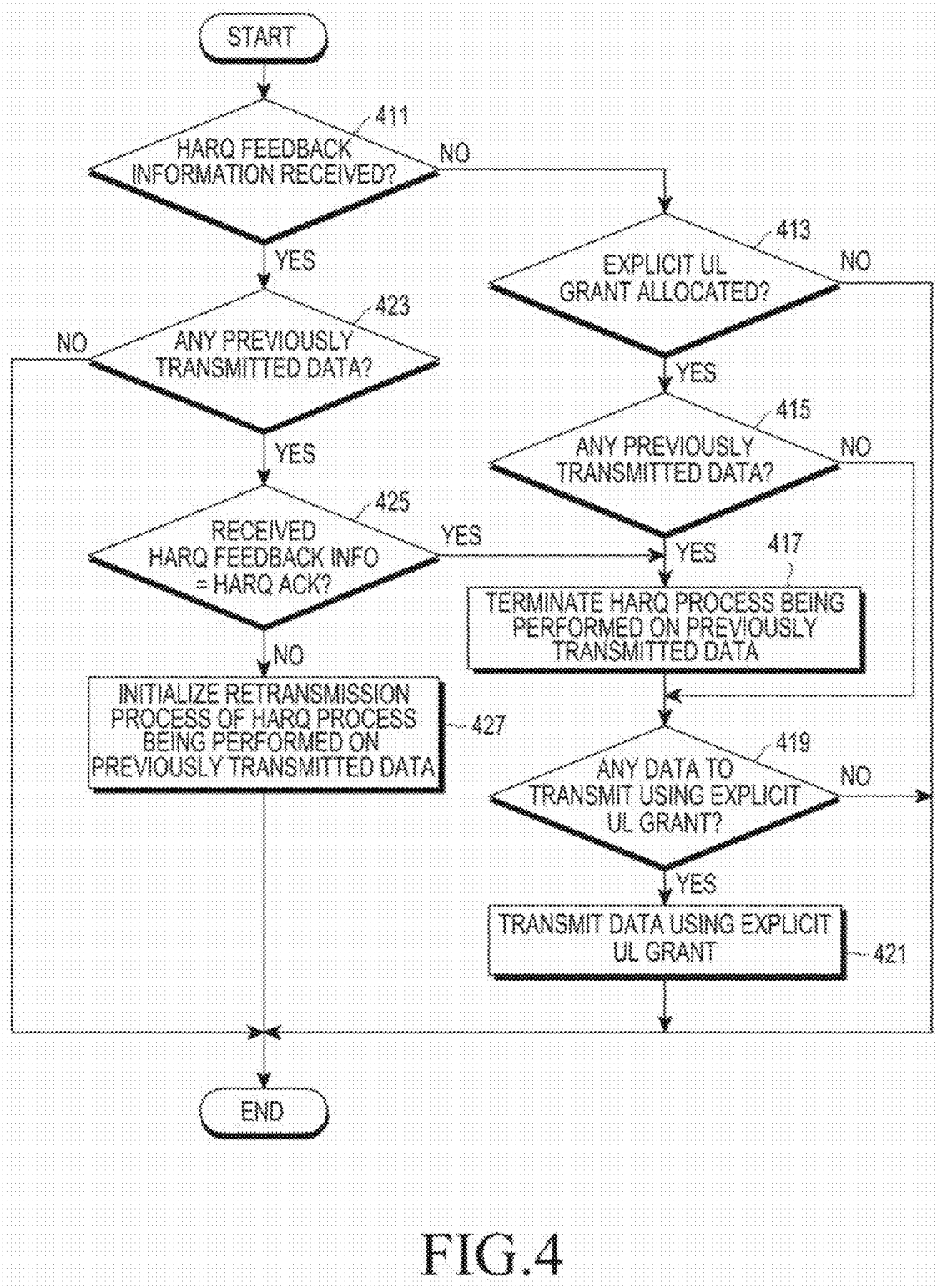
FIG. 4 illustrates a process of the UE 211 in FIG. 2.

FIG. 4 illustrates a process of the UE 211 in FIG. 2.

Referring to FIG. 4, the UE 211 determines in block 411 whether HARQ feedback information is received from the eNB 213. If no HARQ feedback information is received from the eNB 213, the UE 211 determines in block 413 whether it is allocated an Explicit UL grant from the eNB 213. If the UE 211 is allocated an Explicit UL grant, the UE 211 determines in block 415 whether there is previously transmitted data. If there is previously transmitted data, the UE 211 terminates a HARQ process being performed on the previously transmitted data in block 417. In block 419, the UE 211 determines if it has data to transmit using the Explicit UL grant. If the UE 211 has data to transmit using the Explicit UL grant, the UE 211 transmits the data using the Explicit UL grant in block 421. If it is determined in block 415 that there is no previously transmitted data, the UE 211 proceeds to block 419.

If it is determined in block 411 that HARQ feedback information has been received from the eNB 213, the UE 211 determines in block 423 whether there is previously transmitted data. If there is previously transmitted data, the UE 211 determines in block 425 whether the received HARQ feedback information is a HARQ ACK. If the received HARQ feedback information is not a HARQ ACK but a HARQ NACK, the UE 211 initializes a retransmission process of the HARQ process being performed on the previously transmitted data in block 427. However, if it is determined in block 425 that the received HARQ feedback information is a HARQ ACK, the UE 211 proceeds to block 417.

As described with reference to FIGS. 1 to 4, when allocated an Explicit UL grant, a UE is allowed not to transmit padding MAC PDUs if it has no data to transmit on a UL. Even though the UE transmits no padding MAC PDUs, the HARQ process between the UE and the eNB may be normally performed.

Next, operations of a UE and an eNB in an LTE communication system using the second blind scheduling scheme according to an embodiment of the present invention will be described.

When the conventional LTE communication system uses SPS, a scheme of terminating the use of SPS may be roughly classified into two schemes: an implicit scheme and an explicit scheme.

In the implicit scheme, if a UE transmits a padding MAC PDU using a Configured UL grant a predetermined number of times or more, the UE itself terminates the use of SPS. The information about the predetermined number of times is included in an SPS configuration IE, and a format of the conventional SPS configuration IE is as shown Table 1 below.

TABLE 1

```
SPS-ConfigUL ::= CHOICE {
    release         NULL,
    setup           SEQUENCE {
        semiPersistSchedIntervalUL  ENUMERATED {
```

TABLE 1-continued

|  | sf10, sf20, sf32, sf40, sf64, sf80, sf128, sf160, sf320, sf640, spare6, spare5, spare4, spare3, spare2, spare1}, |
|---|---|
| implicitReleaseAfter | ENUMERATED {e2, e3, e4, e8}, |

```
    }
}
```

In Table 1, a semiPersistSchedIntervalUL field represents an interval for which a Configured UL grant is allocated, and for example, if a value of the semiPersistSchedIntervalUL field is 'sfL', it indicates that a Configured UL grant is allocated every L subframes. Among values of the semiPersistSchedIntervalUL field, 'spareM' represents a spare value of the semiPersistSchedIntervalUL field, which is to be used in the future. Herein, a value of the semiPersistSchedIntervalUL field that the eNB actually transmits in an SPS configuration IE is any one of the 'sfL' values.

In Table 1, an implicitReleaseAfter field represents the number of transmissions of a padding MAC PDU which is used to terminate the use of SPS using the implicit scheme. For example, 'eN' indicates that the UE may terminate the use of SPS after transmitting a padding MAC PDU N times. Herein, a value of the implicitReleaseAfter field that an eNB actually transmits in an SPS configuration IE is any one of the 'eN' values.

When using the implicit scheme, an eNB terminates the allocation of a Configured UL grant to a UE if the UE transmits a padding MC PDU as many times as the value of the implicitReleaseAfter field. That is, if the UE transmits a padding MAC PDU as many times as the value of the implicitReleaseAfter field, both the UE and the eNB no longer use SPS, so they can no longer use the Configured UL grant.

In the second blind scheduling scheme proposed by the present invention, a UE transmits no padding MAC PDUs using a Configured UL grant if it has no data to transmit using the Configured UL grant. Conventionally, as described with reference to Table 1, when using SPS, if a UE has no data to transmit using a Configured UL grant a predetermined number of times or more, i.e., the UE transmits a padding MAC PDU a predetermined number of times or more, the use of SPS is terminated. However, in the second blind scheduling scheme according to an embodiment of the present invention, a modified SPS configuration IE format is proposed such that the use of SPS may not be terminated even if a UE has no data to transmit using a Configured UL grant, i.e., if the UE does not transmit data using the Configured UL grant. The modified SPS configuration IE format is as shown in Table 2 below.

TABLE 2

```
SPS-ConfigUL ::= CHOICE {
    release         NULL,
    setup           SEQUENCE {
        semiPersistSchedIntervalUL  ENUMERATED {
                                        sf10, sf20, sf32, sf40, sf64, sf80,
                                        sf128, sf160, sf320, sf640, spare6,
                                        spare5, spare4, spare3, spare2,
                                        spare1},
        implicitReleaseAfter         ENUMERATED {e2, e3, e4, e8, none},
        ...
    }
}
```

As illustrated in Table 2, while a semiPersistSchedIntervalUL field is the same as the semiPersistSchedIntervalUL field in the conventional SPS configuration IE, an implicitReleaseAfter field is modified to represent 'none', which indicates that the use of SPS is not terminated even when a UE does not transmit data using a Configured UL grant. Herein, a value of the implicitReleaseAfter field that an eNB transmits in the modified SPS configuration IE is 'none'.

When using the modified SPS configuration IE, if a UE has no data to transmit on a UL, the use of SPS is not terminated even though the UE does not transmit padding MAC PDUs using a Configured UL grant.

In contrast, if a UE transmits as many padding MAC PDUs as a value of the implicitReleaseAfter field using a Configured UL grant, an implicit release operation of an SPS may be granted to automatically release a Configured UL grant if the UE does not transmit data during a Configured UL grant occasion corresponding to a value indicated by the implicitReleaseAfter field, instead of automatically releasing the Configured UL grant. In this situation, the conventional SPS configuration IE format may be used. The Configured UL grant occasion will be described in detail below.

An SPS grant repeatedly occurs at regular intervals beginning from the time a Configured UL grant is allocated to a UE over a PDCCH. For example, once a Configured UL grant is allocated to a UE at a time 'x', the Configured UL grant repeatedly occurs in x+interval, x+2*interval, x+3*interval, and so on, and the UE performs UL transmission using the Configured UL grants. The time at which the Configured UL grant occurs is called a Configured UL grant occasion, and the UE automatically releases the Configured UL grant if the UE does not transmit data using the Configured UL grant as it has no data to transmit, during a Configured UL grant occasion corresponding to the value of the implicitReleaseAfter field. That is, the UE automatically releases a Configured UL grant if the UE does not continuously use the Configured UL grant as many times as the value of the implicitReleaseAfter field. The reason for defining the scheme of automatically releasing a Configured UL grant is to minimize the malfunction problems which may occur when a UE mistakes an SPS resource allocated to another UE for an SPS resource allocated to the UE itself because of its failure to detect residual errors.

Next, operations of a UE and an eNB in an LTE communication system using the third blind scheduling scheme according to an embodiment of the present invention will be described.

In the third blind scheduling scheme proposed by the present invention, a new C-RNTI is proposed to not allow transmitting padding MAC PDUs using a UL grant mapped to a pertinent C-RNTI, and the newly proposed C-RNTI will be referred to as Fast Access Scheduling (FAS) C-RNTI. That is, a UE may not transmit padding MAC PDUs using a UL grant mapped to the FAS C-RNTI. An eNB may allocate a FAS C-RNTI to a UE in advance in a process before it allocates a UL grant, and a process in which the FAS C-RNTI is allocated may be, for example, a Radio Resource Control (RRC) Connection Setup process. It will be apparent to those skilled in the art that the eNB may allocate a FAS C-RNTI to a UE in any process other than the RRC Connection Setup process as long as it is a process before the eNB allocates a UL grant. For convenience, a scheduling scheme using the FAS C-RNTI will be referred to herein as a 'FAS scheme'.

The eNB may allocate a FAS C-RNTI to UEs when its load is relatively low. In addition, when there are UEs requiring periodic fast access, the eNB may allocate a FAS C-RNTI to the UEs.

The eNB determines a UL grant mapped to a FAS C-RNTI taking into account the Modulation and Coding Scheme (MCS) level, the Transport Block (TB) size, the number of Radio Bearers (RBs), and such. For convenience, a UL grant mapped to a FAS C-RNTI will be referred to herein as a 'FAS grant'.

The eNB may inform a UE of an allocation cycle of a FAS grant using a FAS configuration IE and may transmit resource allocation information for a FAS grant to a UE using a PDCCH. On the other hand, the eNB may transmit resource allocation information for a FAS grant to a UE using a PDCCH at any time without using the FAS configuration IE.

The FAS configuration IE is as shown in Table 3.

TABLE 3

```
FAS-ConfigUL ::= CHOICE {
    release          NULL,
    setup            SEQUENCE {
        FastAccessSchedIntervalUL      ENUMERATED {
                                       sf1, sf2, sf5, sf10, sf20, sf32,
                                       sf40, sf64, sf80, sf128, sf160,
                                       sf320, sf640, spare3, spare2, spare1},
        ...
    }
}
```

In Table 3, a FastAccessSchedIntervalUL field represents an interval during which a FAS grant is allocated. For example, if a value of the FastAccessSchedIntervalUL field is 'sfL', it indicates that a FAS grant is allocated every L subframes. Among values of the FastAccessSchedIntervalUL field, 'spareM' represents a spare value of the FastAccessSchedIntervalUL field, which is to be used in the future. Herein, a value of the FastAccessSchedIntervalUL field that the eNB transmits in a FAS configuration IE is any one of the 'sfL' values.

A process of transmitting a FAS configuration IE to a UE by an eNB will now be described with reference to FIGS. 5 and 6.

Figure 5:
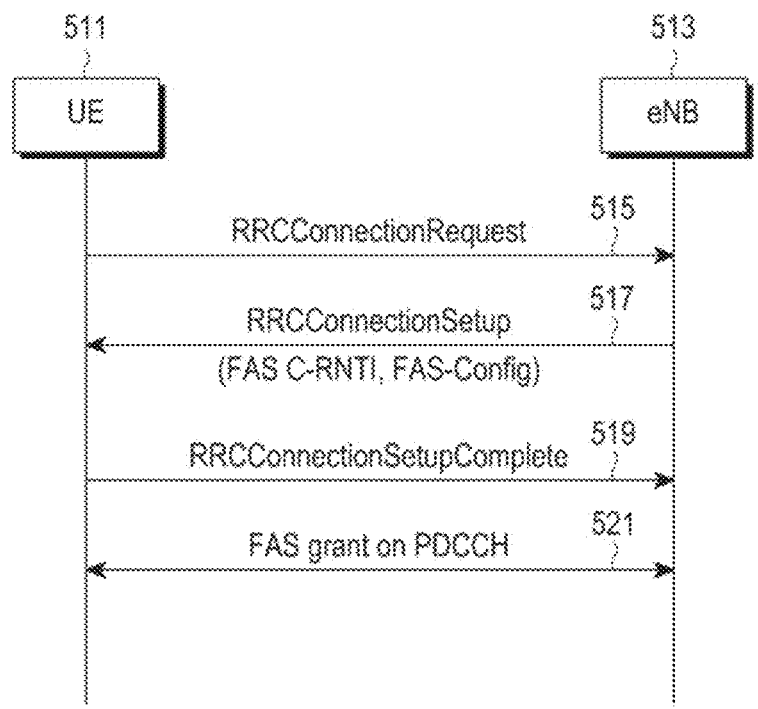
FIG. 5 is a signaling diagram of an example process of transmitting a FAS configuration IE to a UE by an eNB in an LTE communication system using a third blind scheduling scheme according to an embodiment of the present invention.

FIG. 5 illustrates an example process of transmitting a FAS configuration IE to a UE by an eNB in an LTE communication system using a third blind scheduling scheme according to an embodiment of the present invention.

Referring to FIG. 5, a UE 511 transmits an RRC Connection Request message to an eNB 513 in step 515. Upon receiving the RRC Connection Request message, the eNB 513 transmits an RRC Connection Setup message to the UE 511 in step 517. The RRC Connection Setup message includes a FAS C-RNTI allocated to the UE 511, and a FAS configuration IE (represented by 'FAS-Config' in FIG. 5).

Upon receiving the RRC Connection Setup message, the UE 511 transmits a RRC Connection Setup Complete message to the eNB 513 in step 519. When the RRC Connection Setup process between the UE 511 and the eNB 513 is completed, the eNB 513 allocates a FAS grant to the UE 511 and transmits resource allocation information for the FAS grant to the UE 511 through a PDCCH (FAS grant on DPCCH) in step 521.

Figure 6:
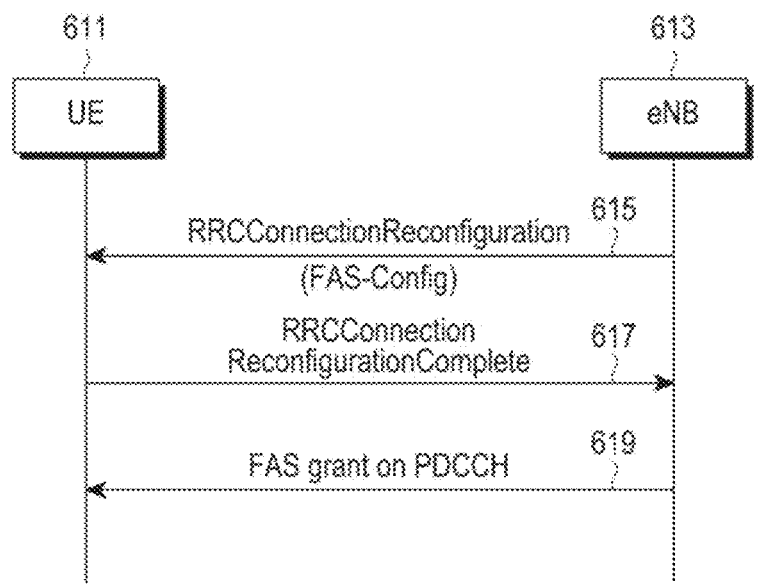
FIG. 6 is a signaling diagram of an another example process of transmitting a FAS configuration IE to a UE by an eNB in an LTE communication system using a third blind scheduling scheme according to an embodiment of the present invention.

FIG. 6 illustrates another example process of transmitting a FAS configuration IE to a UE by an eNB in an LTE communication system using a third blind scheduling scheme according to an embodiment of the present invention.

Referring to FIG. 6, an eNB 613 transmits an RRC Connection Reconfiguration message to a UE 611 in step 615. The RRC Connection Reconfiguration message includes a FAS configuration IE (represented by 'FAS-Config' in FIG. 6).

Upon receiving the RRC Connection Reconfiguration message, the UE 611 transmits an RRC Connection Reconfiguration Complete message to the eNB 613 in step 617. When the RRC Connection Reconfiguration process between the UE 611 and the eNB 613 is completed, the eNB 613 allocates a FAS grant to the UE 611, and transmits resource allocation information for the FAS grant to the UE 611 through a PDCCH (FAS grant on DPCCH) in step 619.

A process of a UE in an LTE communication system using a third blind scheduling scheme according to an embodiment of the present invention will now be described with reference to FIG. 7.

Figure 7:
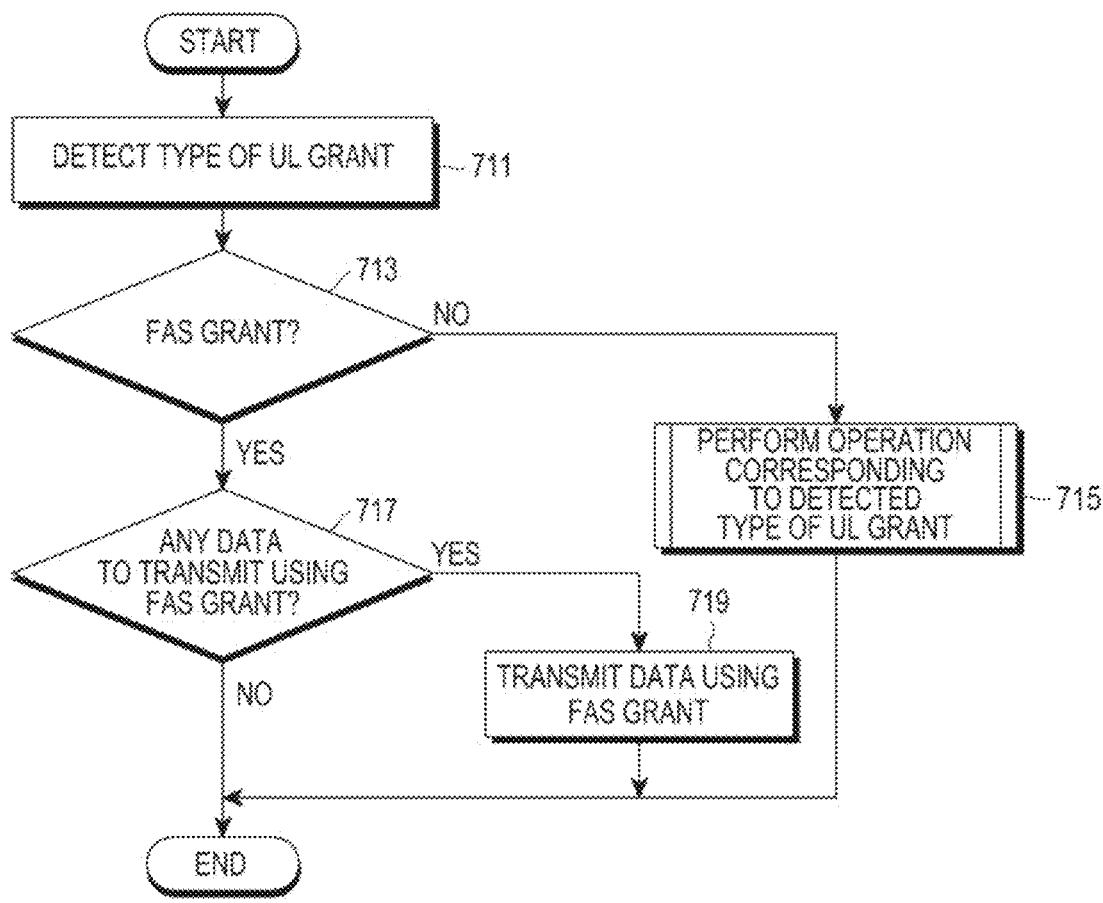
FIG. 7 illustrates a process of a UE in an LTE communication system using a third blind scheduling scheme according to an embodiment of the present invention.

FIG. 7 illustrates a process of a UE in an LTE communication system using a third blind scheduling scheme according to an embodiment of the present invention.

Referring to FIG. 7, the UE detects a type of a UL grant in block 711, and determines in block 713 whether the detected type of the UL grant is a FAS grant. If the detected type of the UL grant is not a FAS grant, the UE performs an operation corresponding to the detected type of the UL grant in block 715.

However, if it is determined in block 713 that the detected type of the UL grant is a FAS grant, the UE determines in block 717 whether it has data to transmit using the FAS grant. If the UE has no data to transmit using the FAS grant, the UE no ends the process. That is, as described above, the UE may not transmit padding MAC PDUs using the FAS grant.

However, if it is determined in block 717 that the UE has data to transmit using the FAS grant, the UE transmits the data using the FAS grant in block 719.

As described with reference to FIG. 7, if the type of the UL grant is a FAS grant, the UE transmits no padding MAC PDUs when it has no data to transmit on a UL. A signal exchange process between an eNB and a UE performed in this situation will be described with reference to FIG. 8.

Figure 8:
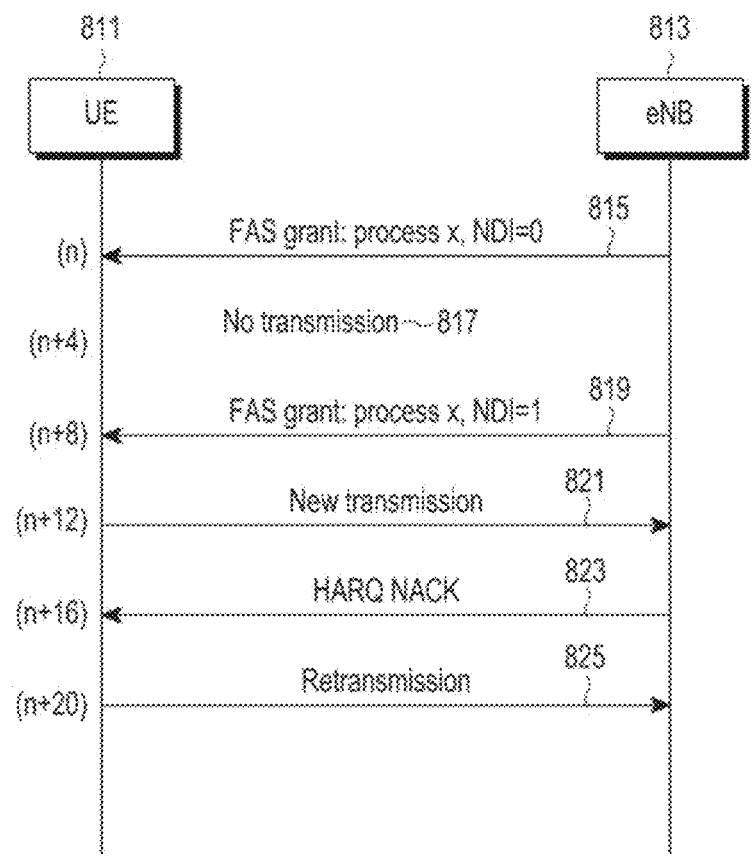
FIG. 8 is a signaling diagram of a signal exchange process between an eNB and a UE in an LTE communication system using a third blind scheduling scheme according to an embodiment of the present invention.

FIG. 8 illustrates a signal exchange process between an eNB and a UE in an LTE communication system using a third blind scheduling scheme according to an embodiment of the present invention.

The signal exchange process between an eNB and a UE illustrated in FIG. 8 is substantially the same as that described with reference to FIG. 2 except that the UL grant replaces a FAS grant, so a detailed description thereof will be omitted.

A process of the eNB 813 in FIG. 8 will be described in detail with reference to FIG. 9.

Figure 9:
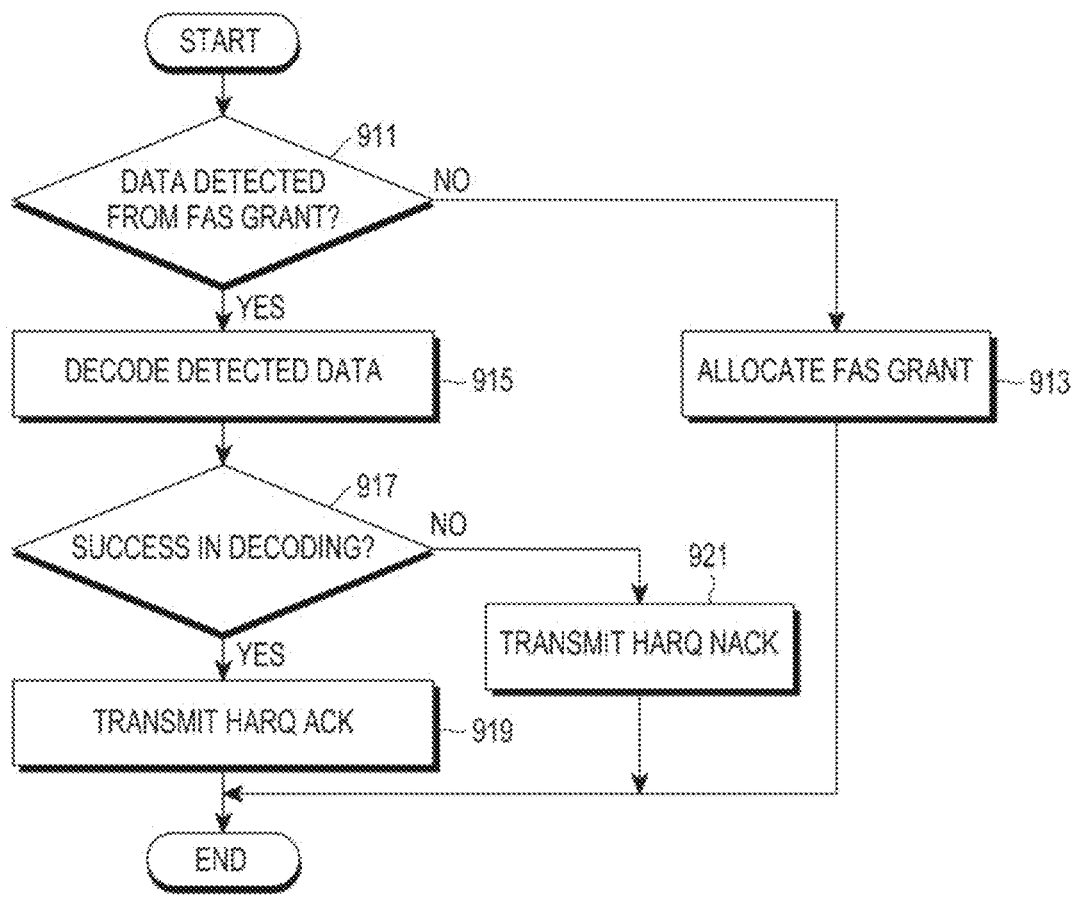
FIG. 9 illustrates a process of the eNB 813 in FIG. 8.

FIG. 9 illustrates a process of the eNB 813 in FIG. 8.

The process of the eNB 813 illustrated in FIG. 9 is substantially the same as that described with reference to FIG. 3 except that the UL grant replaces a FAS grant, so a detailed description thereof will be omitted herein. Likewise, the process of the eNB 813, illustrated in FIG. 9, may be performed more effectively when its energy detection reliability is relatively high.

Next, a process of the UE 811 in FIG. 8 will be described in detail with reference to FIG. 10.

Figure 10:
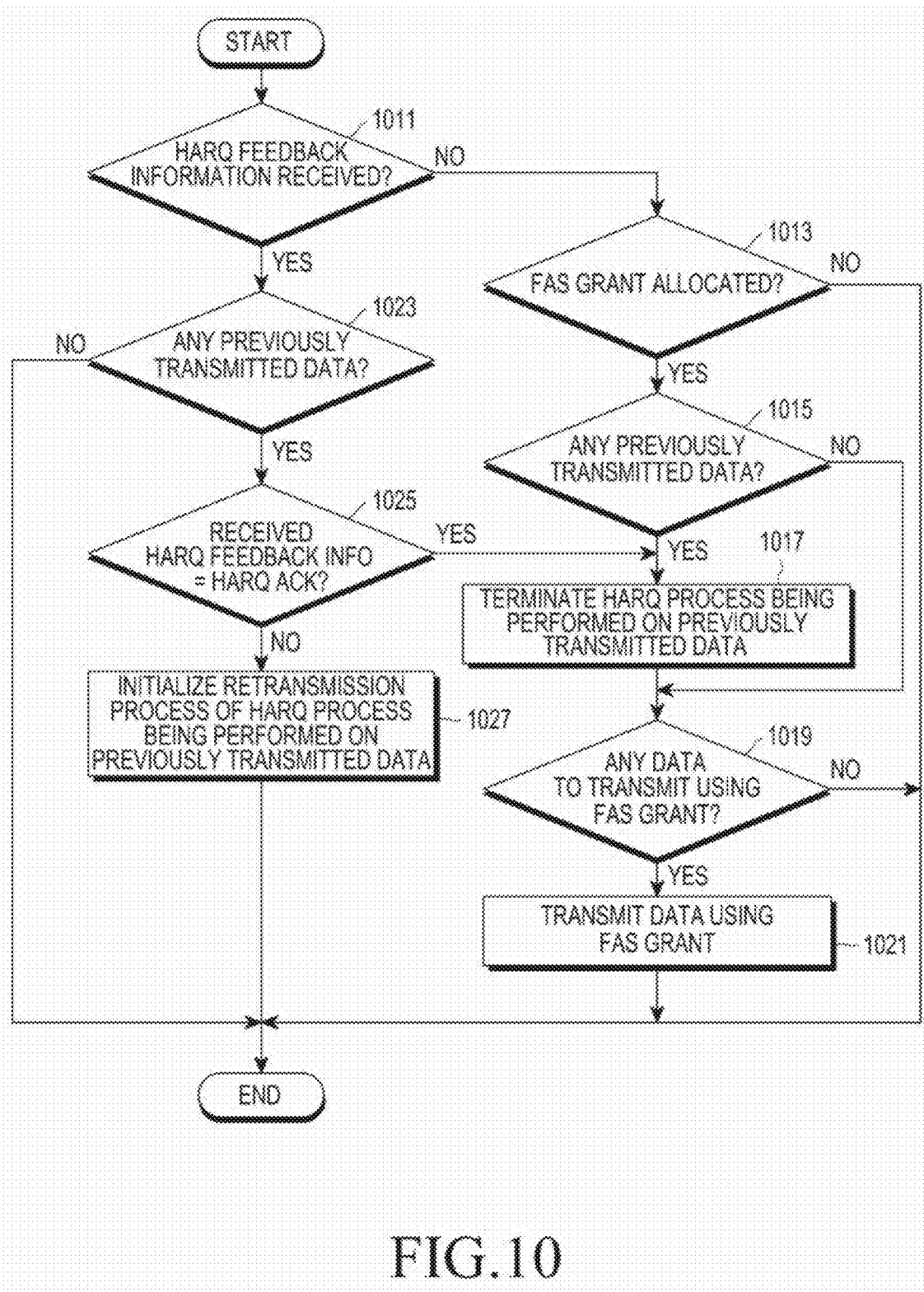
FIG. 10 illustrates a process of the UE 811 in FIG. 8.

FIG. 10 illustrates a process of the UE 811 in FIG. 8.

The process of the UE 811 illustrated in FIG. 10 is substantially the same as that described with reference to FIG. 4 except that the UL grant replaces a FAS grant, so a detailed description thereof will be omitted herein.

As described with reference to FIGS. 7 to 10, when allocated a FAS grant, the UE is not allowed to transmit padding MAC PDUs even though it has no data to transmit on a UL. Even though the UE transmits no padding MAC PDUs, the HARQ process between the UE and the eNB may be performed normally.

Next, an internal structure of an eNB in an LTE communication system according to an embodiment of the present invention will be described with reference to FIG. 11.

Figure 11:
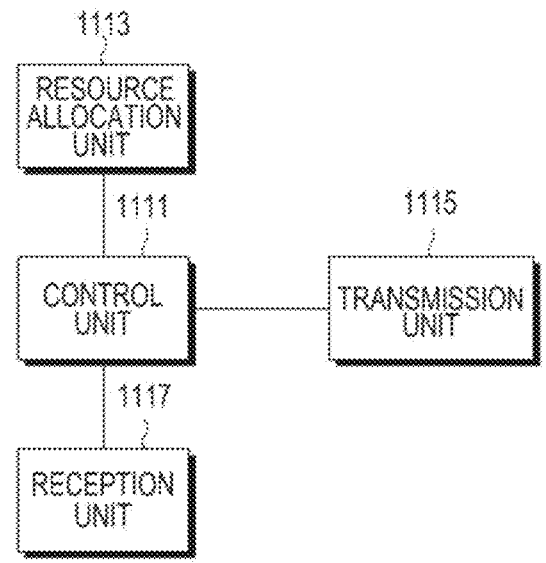
FIG. 11 is a diagram of an internal structure of an eNB in an LTE communication system according to an embodiment of the present invention.

FIG. 11 illustrates an internal structure of an eNB in an LTE communication system according to an embodiment of the present invention.

Referring to FIG. 11, the eNB includes a control unit 1111, a resource allocation unit 1113, a transmission unit 1115, and a reception unit 1117.

The control unit 1111 controls the overall operation of the eNB to perform operations corresponding to the first to third blind scheduling schemes proposed by the present invention. These operations corresponding to the first to third blind scheduling schemes and performed by the eNB have been described above, so detailed descriptions thereof will be omitted herein.

The resource allocation unit 1113 allocates resources or UL grants under control of the control unit 1111, and a type of a UL grant allocated by the resource allocation unit 1113 is determined according to the first to third blind scheduling schemes, as described above.

The transmission unit 1115 transmits resource allocation information for a UL grant allocated by the resource allocation unit 1113 under control of the control unit 1111. The transmission unit 1115, under control of the control unit 1111, transmits HARQ feedback information for the data received through the reception unit 1117, and transmits a control message such as an RRC Connection Setup message. The resource allocation information and control messages transmitted by the transmission unit 1115 have been described together with the first to third blind scheduling schemes, so detailed descriptions thereof will be omitted herein.

The reception unit 1117, under control of the control unit 1111, receives data from a UL grant and decodes the received data. The reception unit 1117 receives control messages such as an RRC Connection Request message, and the control messages received through the reception unit 1117 have been described together with the first to third blind scheduling schemes, so detailed descriptions thereof will be omitted herein.

Next, an internal structure of a UE in an LTE communication system according to an embodiment of the present invention will be described with reference to FIG. 12.

Figure 12:
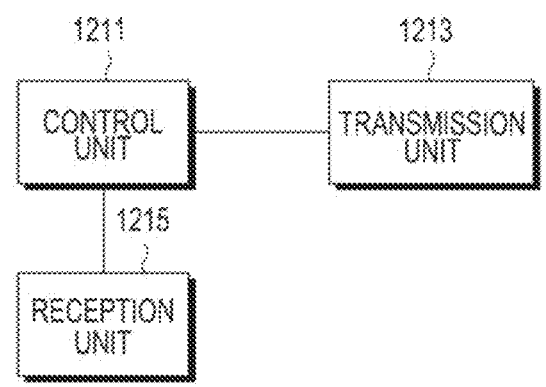
FIG. 12 is a diagram of an internal structure of a UE in an LTE communication system according to an embodiment of the present invention.

FIG. 12 illustrates an internal structure of a UE in an LTE communication system according to an embodiment of the present invention.

Referring to FIG. 12, the UE includes a control unit 1211, a transmission unit 1213, and a reception unit 1215.

The control unit 1211 controls the overall operation of the UE to perform operations corresponding to the first to third blind scheduling schemes proposed by the present invention. These operations corresponding to the first to third blind scheduling schemes and performed by the UE have been described above, so detailed descriptions thereof will be omitted herein.

The transmission unit 1213 transmits data using a UL grant allocated from an eNB under control of the control unit 1211. The transmission unit 1213 transmits control messages such as an RRC Connection Request message under control of the control unit 1211. The control messages transmitted by the transmission unit 1213 have been described together with the first to third blind scheduling schemes, so detailed descriptions thereof will be omitted herein.

The reception unit 1215 receives HARQ feedback information and control messages such as RRC Connection Setup messages from an eNB, under control of the control unit 1211. The control messages received through the reception unit 1215 have been described together with the first to third blind scheduling schemes, so detailed descriptions thereof will be omitted herein.

As is apparent from the forgoing description, the present invention enables blind scheduling that prevents unnecessary transmission of padding MAC PDUs, thereby minimizing a waste of the UE battery due to the transmission of padding MAC PDUs, minimizing a signaling overhead caused by the exchange of padding MAC PDUs, and minimizing a processing load due to the decoding of padding MAC PDUs by an eNB.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a terminal in a communication system, the method comprising:
receiving a radio resource control (RRC) message related to a first uplink (UL) grant;
identifying the first UL grant based on the RRC message;
identifying that there is no data to transmit based on a first UL resource related to the identified first UL grant; and
determining not to generate a medium access control (MAC) protocol data unit (PDU) to transmit, based on the identified first UL grant and the identification that there is no data to transmit based on the first UL resource,
wherein the RRC message includes a first identifier (ID) of the terminal and a period of the identified first UL grant, and the identified first UL grant is associated with the first ID of the terminal.

2. The method of claim 1, wherein the MAC PDU is a padding MAC PDU.

3. The method of claim 1, further comprising:
receiving information related to a second UL grant on a physical downlink control channel (PDCCH);
identifying the second UL grant based on the received information;
identifying that there is no data to transmit based on a second UL resource related to the identified second UL grant; and
determining to generate the MAC PDU to transmit, based on the identified second UL grant and the identification that there is no data to transmit based on the second UL resource.

4. The method of claim 3, wherein the identified second UL grant is associated with a second ID of the terminal.

5. A terminal in a communication system, comprising:
a transceiver; and
at least one processor configured to:
control the transceiver to receive a radio resource control (RRC) message related to a first uplink (UL) grant,
identify the first UL grant based on the RRC message,
identifying that there is no data to transmit based on a first UL resource related to the identified first UL grant, and
determine not to generate a medium access control (MAC) protocol data unit (PDU) to transmit, based on the identified first UL grant and the identification that there is no data to transmit based on the first UL resource,
wherein the RRC message includes a first identifier (ID) of the terminal and a period of the identified first UL grant, and the identified first UL grant is associated with the first ID of the terminal.

6. The terminal of claim 5, wherein the MAC PDU is a padding MAC PDU.

7. The terminal of claim 5, wherein the at least one processor is further configured to:
control the transceiver to receive information related to a second UL grant on a physical downlink control channel (PDCCH),
identify the second UL grant based on the received information,
identify that there is no data to transmit based on a second UL resource related to the identified second UL grant, and
determine to generate the MAC PDU to transmit, based on the identified second UL grant and the identification that there is no data to transmit based on the second UL resource.

8. The terminal of claim 7, wherein the identified second UL grant is associated with the second ID of the terminal.

9. A method of base station (BS) in a communication system, the method comprising:
generating a radio resource control (RRC) message related to a first uplink (UL) grant; and
transmitting the RRC message to a terminal,
wherein a medium access control (MAC) protocol data unit (PDU) is not generated by the terminal, based on the first UL grant identified based on the RRC message and identification that there is no data to transmit based on a first UL resource related to the first UL grant, and
wherein the RRC message includes a first identifier (ID) of the terminal and a period of the first UL grant, and the first UL grant is associated with the first ID of the terminal.

10. The method of claim 9, wherein the MAC PDU is a padding MAC PDU.

11. The method of claim 9, further comprising:
transmitting, to the terminal, information related to a second UL grant on a physical downlink control channel (PDCCH),
wherein the MAC PDU is generated by the terminal, based on the second UL grant identified based on the transmitted information and the identification that there is no data to transmit based on a second UL resource related to the second UL grant.

12. The method of claim 11, wherein the second UL grant is associated with a second ID of the terminal.

13. A base station in a communication system, comprising:
a transceiver; and
at least one processor configured to:
generate a radio resource control (RRC) message related to a first uplink (UL) grant, and
control the transceiver to transmit the RRC message to a terminal,
wherein a medium access control (MAC) protocol data unit (PDU) is not generated by the terminal, based on the first UL grant identified based on the RRC message and identification that there is no data to transmit based on a first UL resource related to the first UL grant, and
wherein the RRC message includes a first identifier (ID) of the terminal and a period of the first UL grant, and the first UL grant is associated with the first ID of the terminal.

14. The BS of claim 13, wherein the MAC PDU is a padding MAC PDU.

15. The BS of claim 13, wherein the at least one processor is further configured to control the transceiver to transmit, to the terminal, information related to a second UL grant on a physical downlink control channel (PDCCH), and
wherein the MAC PDU is generated by the terminal, based on the second UL grant identified based on the transmitted information and the identification that there is no data to transmit based on a second UL resource related to the second UL grant.

16. The BS of claim 15, wherein the second UL grant is associated with a second ID of the terminal.

* * * * *

UNITED STATES PATENT AND TRADEMARK OFFICE
CERTIFICATE OF CORRECTION

PATENT NO. : 11,291,027 B2
APPLICATION NO. : 16/907106
DATED : March 29, 2022
INVENTOR(S) : Ok-Seon Lee et al.

Page 1 of 1

It is certified that error appears in the above-identified patent and that said Letters Patent is hereby corrected as shown below:

On the Title Page

Column 1, Below Item (63), Line 3, insert the following:
-- (30) Foreign Application Priority Data
Jun. 21, 2010 (KR) 10-2010-0058717 --.

Signed and Sealed this
Fourteenth Day of February, 2023

Katherine Kelly Vidal
*Director of the United States Patent and Trademark Office*